United States Patent [19]

Wadell

[11] Patent Number: 5,173,075
[45] Date of Patent: Dec. 22, 1992

[54] CUTTING OF SAUSAGE MEAT

[75] Inventor: Lars G. A. Wadell, Aengelholm, Sweden

[73] Assignee: Nestec S.A., Vevey, Switzerland

[21] Appl. No.: 726,864

[22] Filed: Jul. 8, 1991

[30] Foreign Application Priority Data

Aug. 31, 1990 [EP] European Pat. Off. ........ 90116712.2

[51] Int. Cl.[5] .............................................. A22C 11/00
[52] U.S. Cl. ...................................... 452/46; 452/48; 452/49
[58] Field of Search ...................... 452/29, 30, 46, 38, 452/32, 48, 49

[56] References Cited

U.S. PATENT DOCUMENTS

| 4,060,875 | 12/1977 | Gosling et al. | 452/49 |
| 4,418,447 | 12/1983 | Ziolko | 452/49 |
| 4,517,786 | 5/1985 | Barker | 452/47 |
| 4,649,602 | 3/1987 | Kupcikevicius | 452/49 |
| 4,730,367 | 3/1988 | Vinokur | 452/32 |

FOREIGN PATENT DOCUMENTS 651983 11/1962 Canada ............................. 452/49

Primary Examiner—Willis Little
Attorney, Agent, or Firm—Vogt & O'Donnell

[57] ABSTRACT

Sausage meat is fed through a tube of a cutting head and is cut by a cutter which is connected to a part of the cutting head which is rotatable.

14 Claims, 2 Drawing Sheets

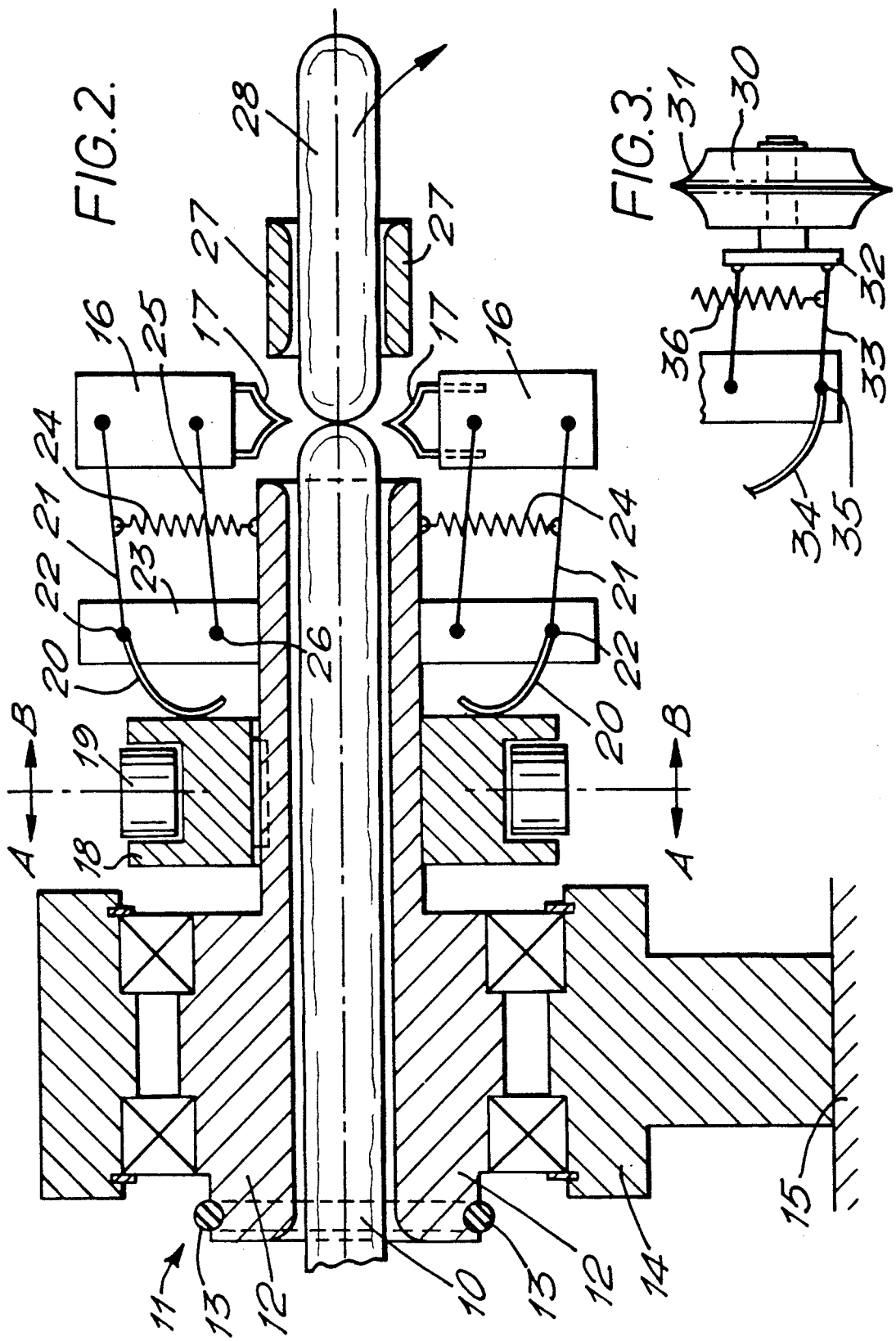

CUTTING OF SAUSAGE MEAT

BACKGROUND OF THE INVENTION

The present invention relates to a device and method of cutting meat, more particularly skinless sausages.

SUMMARY OF THE INVENTION

According to the present invention there is provided a cutting device for sausage meat comprising a surrounding and supporting tubular cutting head for a strand of sausage meat comprising a rotating profiled cutting means for cutting the sausage meat strand transversely into sausages having convex shaped ends.

The present invention also provides a process for cutting sausage meat which comprises feeding sausage meat through a cutting head and cutting the sausage meat transversely into sausages with a cutting means to form pieces having convex-shaped ends.

As disclosed and illustrated in more detail below and in the drawing FIGS., the cutting device comprises a cutting head, which includes a tube, and a reciprocable cutting means which is positioned adjacent an exit of the tube and which is connected to the head so that the cutting means is rotatable with at least a part of the head and so that the cutting means reciprocates transversely to and from a longitudinal axis of the tube for cutting sausage fed from the tube exit into pieces having convex-shaped ends. In one embodiment, the tube of the cutting head is rotatable, and the cutting means is connected to a support connected to the tube so that the cutting means and tube rotate together. In another embodiment, the cutting head further comprises a part positioned to be rotatable about the tube, and the cutting means is connected to a support connected to the part so that the cutting means and part rotate together.

As also disclosed and illustrated, a process of the present invention comprises rotating at least a part of a cutting head, which includes a tube, and a cutting means which is positioned adjacent the tube and which is reciprocable with respect to a longitudinal axis of the tube, feeding sausage meat through the tube, reciprocating the cutting means to and from the longitudinal axis of the tube for cutting the sausage meat fed from the exit of the tube into pieces of sausage having convex ends, the cutting means being rotatable with the cutting head tube or with a cutting head part positioned about the tube.

DETAILED DESCRIPTION OF THE INVENTION

In the apparatus of the present invention, conveniently, means are provided to feed sausage meat into the tube of the cutting head. The rotating profiled cutting means may conveniently be connected to at least part of the cutting head which is adapted to rotate on its longitudinal axis. Either part or the whole of the cutting head may be adapted to rotate.

The profiled cutting means is adapted to reciprocate into and out of a cutting position.

The profiled cutting means may be one or more profiled steel wire knives or one or more profiled pressure rollers having a concave configuration corresponding to the desired convex shaped ends of a pair of adjacent sausages in end to end contact.

During the cutting operation, the rotating cutting head may be stationary or "flying". In the former case, there should be means for enabling the strand of sausage meat to flow discontinuously so that it is stationary while being cut, for example, by creating a loop of sausage before it flows into the cutting head whereby this loop of sausage can slacken and tighten periodically. In the case where the rotating cutting head is "flying", the cutting head is adapted to reciprocate so that it moves simultaneously with the strand of sausage meat during the cutting operation and, after cutting, moves in the reverse direction.

When the whole of the cutting head rotates, the longitudinal axis of the cutting head is preferably vertical to avoid revolving the sausage. When only the part of the cutting head and the cutting means rotates, the longitudinal axis of the cutting head may be positioned in any direction, e.g., horizontal or vertical.

The present invention is further illustrated by way of example only with reference to the accompanying drawings.

BRIEF DESCRIPTION OF THE DRAWINGS

FIG. 2 represents a diagrammatic side sectional view of another type of cutting device.

FIG. 3 represents a diagrammatic side sectional view of a profiled roller.

DETAILED DESCRIPTION OF THE DRAWINGS

Figure 1:
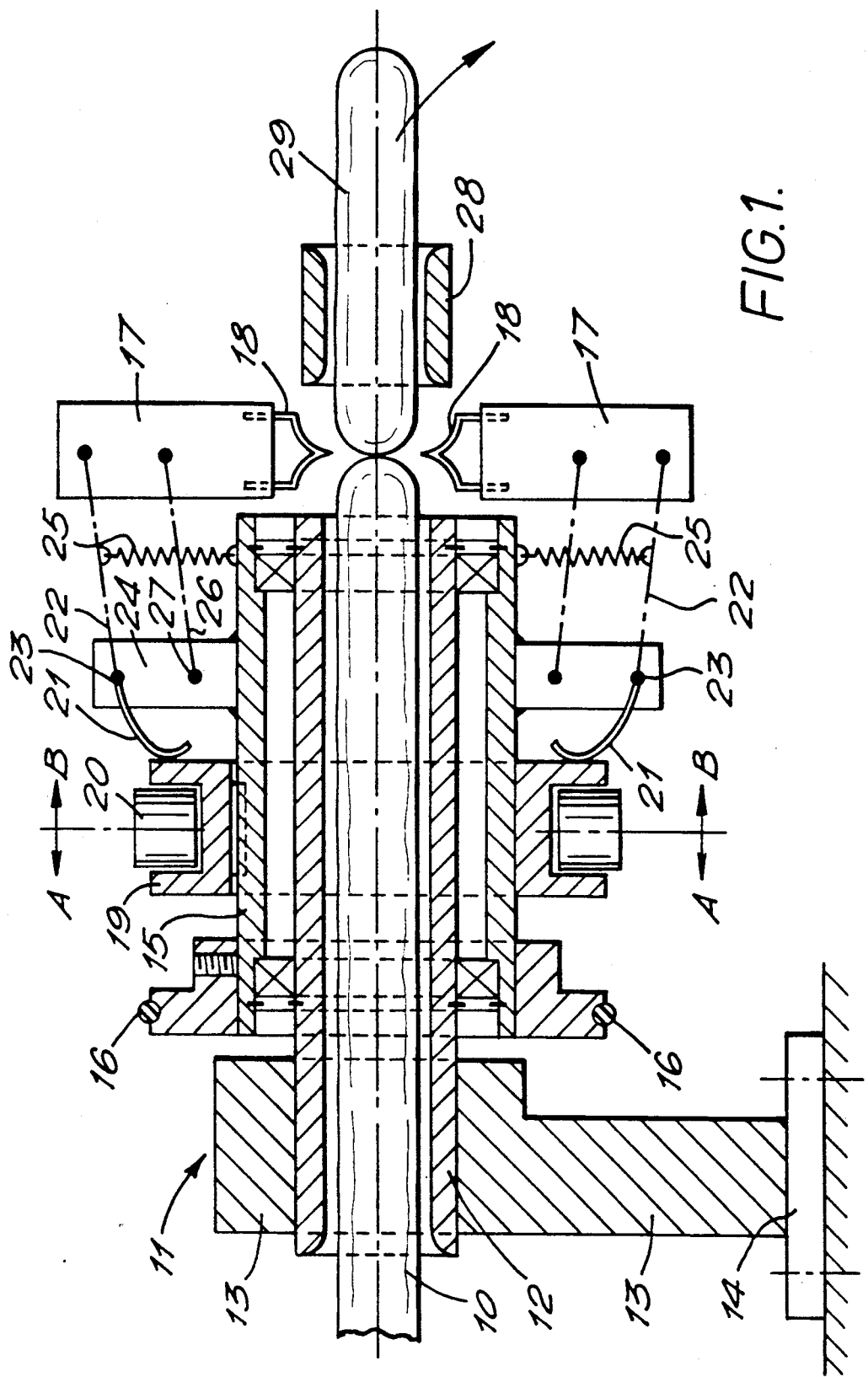
FIG. 1 represents a diagrammatic side sectional view of one type of cutting device.

Referring to FIG. 1 of the drawings, sausage meat 10 supplied by means (not shown) flows through a tubular cutting head, generally designated 11, comprising an inner tube 12 fixed to a support 13 attached to a base plate 14. The cutting head 11 is provided with a rotatable part 15 driven by a drive belt 16. A cutting means support 17 provided with steel wire knives 18 is positioned just beyond the exit of the tube 12. The cutting means support 17 communicates with a reciprocating groove ring 19, which is moveable on rotatable part 15 and provided with rollers 20 mounted on a fork (not shown), by means of the curved end 21 of a lever 22 which pivots about a point 23 on a support 24 connected to cutting head rotatable part 15. The lever 22 is connected to the rotating part 15 by means of a spring 25 enabling the cutting knives to reciprocate to and from a cutting position. A link 26 which pivots about a point 27 creates together with the lever 22, a parallelogram. A supporting tube 28 is provided for the cut sausages 29 before they fall onto a conveyor belt (not shown) for further transport.

In operation, sausage meat 10 flows through the tube 12, the rotating part 15 rotates, and the groove ring 19 reciprocates by means of the rollers 20 in the direction of the arrows A-B and is synchronised to reciprocate at appropriate time intervals so that the rotating steel wire knives 18 advance to contact and cut and then recede from the sausage meat, the flow of which is synchronised to stop during the cutting. When the groove ring 19 moves in the direction A, the cutting means support 17 and knives 18 advance towards the sausage and cutting occurs, and when the groove ring moves in the direction B, it presses against the curved end 21 of lever 22 causing the cutting means support 17 and knives 18 to be withdrawn from the sausage, and cutting ceases.

Referring to FIG. 2 of the drawings, a strand of sausage meat 10 supplied by means (not shown) flows through a reciprocating, rotatable tubular cutting head generally designated 11 whose longitudinal axis is vertical, comprises an inner tube 12 which is, rotated by a drive belt 13 and reciprocated by suitable means (not shown), fitted within a support 14 attached to a base plate 15. A cutting means 16, provided with steel wire knives 17, is positioned just beyond the exit of the tube 12. The cutting means support 16 communicates with a reciprocating groove ring 18, which is provided with rollers 19, by means of the curved end 20 of a lever 21 which pivots about a point 22 on a support 23 connected to rotatable tube 12. The lever 21 is connected to the inner tube 12 by means of a spring 24 enabling the cutting knives to reciprocate to and from a cutting position. A link 25 which pivots about a point 26 creates together with the lever 21, a parallelogram. A supporting tube 27 is provided for the cut sausages 28 before they fall onto a conveyor belt (not shown) for further transport.

In operation, sausage meat 10 flows through the reciprocating rotating tube 12, and the groove ring 18 reciprocates by means of the rollers 19 in the direction of the arrows A-B and is synchronised to reciprocate at appropriate time intervals so that when the groove ring 19 moves in the direction A, the cutting means support 16 and the rotating steel wire knives 17 advance to contact and cut the sausage meat, and when the groove ring moves in the direction B, it presses against the curved end 20 of the lever 21, which pivotes about point 22, to cause the cutting means support 16 and the knives 17 to recede from the sausage, and the cutting ceases. The reciprocating movement of the rotating tube 12 is synchronised with reciprocation of the steel wire knives 17 so that the tube 12 moves simultaneously with the sausage meat strand during the cutting operation and after cutting, moves in the reverse direction.

FIG. 3 shows an alternative cutting means comprising a roller 30 with a profiled edge 31 which provides a cutting edge which is concave in shape and which merges with a complimentary profiled concave edge which enables obtaining a cut sausage having convex shaped ends. This cutting means is illustrated with support plate 32, connecting lever 33 having curved end 34, which pivots about a point 35, and a spring 36.

I claim:

1. A sausage cutting device comprising a cutting head, which includes a tube, and a reciprocable cutting means which is positioned adjacent an exit of the tube and which is connected to the cutting head so that the cutting means is rotatable with at least a part of the head and so that the cutting means reciprocates transversely to and from a longitudinal axis of the tube for cutting sausage fed from the tube exit into pieces having convex ends.

2. A cutting device according to claim 1 wherein the tube is rotatable and wherein the cutting means is connected to a support connected to the tube so that the cutting means is rotatable with the tube.

3. A cutting device according to claim 1 wherein the cutting head further comprises a part positioned to be rotatable about the tube and wherein the cutting means is connected to a support connected to the part so that the cutting means is rotatable with the part.

4. A cutting device according to claim 2 further comprising a groove ring which is positioned about the tube and which is reciprocable in a longitudinal direction of the tube to control reciprocation of the cutting means.

5. A cutting device according to claim 3 further comprising a groove ring which is positioned about the part and which is reciprocable in a longitudinal direction of the tube to control reciprocation of the cutting means.

6. A cutting device according to claim 4 or 5 further comprising a lever which is connected to the support, which is pivotable about a point in the support and which has a curved end which communicates with the groove ring to control reciprocation of the cutting means.

7. A cutting device according to claim 6 wherein the support is connected to the tube and wherein the lever extends from the support to connect the support and the cutting means and further comprising a spring which is connected to the lever and the tube to control reciprocation of the cutting means.

8. A cutting device according to claim 6 wherein the support is connected to the part and wherein the lever extends to connect the support and the cutting means and further comprising a spring which is connected to the lever and the part to control reciprocation of the cutting means.

9. A cutting device according to claim 3 further comprising means to reciprocate the tube in a direction parallel to a longitudinal axis of the tube.

10. A cutting device according to claim 1 wherein the cutting means has a cutting edge comprised of two concave shaped edges which merge.

11. A process for cutting sausage meat comprising rotating at least a part of a cutting head, which includes a tube, together with a cutting means positioned adjacent an exit of the tube, feeding sausage meat through the tube and reciprocating the cutting means transversely with respect to a longitudinal axis of the tube for cutting the sausage fed from the exit of the tube into pieces of sausage having convex ends.

12. A process according to claim 11 wherein the cutting means is connected to the tube so that the cutting means and tube rotate together and further comprising reciprocating the tube in its longitudinal direction so that the tube and cutting means move with the meat fed through the tube during cutting.

13. A process according to claim 11 wherein the cutting means further comprises a part positioned to be rotatable about the tube and the cutting means is connected to the part so that the cutting means and part rotate together.

14. A process according to claim 11 wherein the cutting means has a cutting edge comprised of two concave shaped edges which merge so that the cut sausage meat has convex shaped ends.

* * * * *